United States Patent
Kim

(10) Patent No.: US 12,468,658 B2
(45) Date of Patent: Nov. 11, 2025

(54) SYSTEM ON CHIP AND OPERATING METHOD THEREOF

(71) Applicant: Samsung Electronics Co., Ltd., Suwon-si (KR)

(72) Inventor: Moongyung Kim, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 79 days.

(21) Appl. No.: 18/502,551

(22) Filed: Nov. 6, 2023

(65) Prior Publication Data

US 2024/0193120 A1  Jun. 13, 2024

(30) Foreign Application Priority Data

Dec. 13, 2022 (KR) ................. 10-2022-0174195

(51) Int. Cl.
*G06F 15/78* (2006.01)
*G06F 11/34* (2006.01)

(52) U.S. Cl.
CPC ...... *G06F 15/7807* (2013.01); *G06F 11/3495* (2013.01)

(58) Field of Classification Search
CPC .................. G06F 15/7807; G06F 11/3495
See application file for complete search history.

(56) References Cited

U.S. PATENT DOCUMENTS

| | | | |
|---|---|---|---|
| 7,240,223 B2 * | 7/2007 | de Cesare | G06F 1/3203 713/323 |
| 7,802,120 B2 * | 9/2010 | Conroy | G06F 1/3287 713/340 |
| 7,840,825 B2 | 11/2010 | Altevogt et al. | |
| 10,025,367 B2 | 7/2018 | Kaburlasos et al. | |
| 10,067,556 B2 | 9/2018 | Hickey et al. | |
| 10,261,570 B2 | 4/2019 | Ramadoss et al. | |
| RE48,819 E | 11/2021 | Altmejd et al. | |
| 11,243,768 B2 | 2/2022 | Rotem et al. | |
| 2005/0177327 A1 * | 8/2005 | Banginwar | G06F 1/3203 702/60 |
| 2019/0155606 A1 * | 5/2019 | Rotem | G06F 9/4552 |
| 2022/0026974 A1 | 1/2022 | Cooper et al. | |
| 2024/0143540 A1 * | 5/2024 | Kim | G06F 15/7814 |
| 2024/0193067 A1 * | 6/2024 | Kim | G06F 11/3024 |

* cited by examiner

*Primary Examiner* — Nimesh G Patel
(74) *Attorney, Agent, or Firm* — Harness, Dickey & Pierce, P.L.C.

(57) ABSTRACT

Disclosed are system-on-chip devices (SoCs) and operating methods thereof. A system-on-chip (SOC) may include a memory including a history storage, a processor configured to execute an application, performance optimization module configured to generate and transmit optimized control information for the processor executing a function included in the application, based on a history corresponding to the function, when the processor executes the function and the history corresponding to the function is in the history storage, and a performance management module configured to generate a control signal for controlling performance of the processor, based on the optimized control information received from the performance optimization module, wherein the history includes control information for the processor and utilization information accumulated according to the control information, the control information having been accumulated during at least one time of previous execution of the function.

18 Claims, 10 Drawing Sheets

SYSTEM ON CHIP AND OPERATING METHOD THEREOF

CROSS-REFERENCE TO RELATED APPLICATION

This application is based on and claims priority under 35 U.S.C. § 119 to Korean Patent Application No. 10-2022-0174195, filed on Dec. 13, 2022, in the Korean Intellectual Property Office, the disclosure of which is incorporated by reference herein in its entirety.

BACKGROUND

The inventive concepts relate to system-on-chip devices (SoCs), and more particularly, to SoCs for performing performance control by using optimized control information based on a history (e.g., a utilization of a processor) corresponding to a function and/or operating methods thereof.

According to the related art, processing modules use various performance control technologies including dynamic frequency scaling (DFS) technology or dynamic voltage and frequency scaling (DVFS) technology to satisfy both performance and low-power requirements for execution of applications.

In particular, operating systems (OS) use dynamic performance control technology that predicts and controls performance by collecting information about the current run-state of a processor and predicting the future run-state of the processor.

However, information about the current run-state of a processor is related to hardware factors, and predicted control information based on the information does not reflect a processor performance change due to a software factor, such as a function of an application. Accordingly, there is a large error range of predicted performance and difficulty in immediate control depending on situations, causing unnecessary (or alternatively, undesirable) power/energy consumption and inefficient processing.

Therefore, there is growing interest in performance predictive control considering a change in a software factor (e.g., a history of a function of an application or control setting for execution of a function), beyond performance prediction and control simply based on hardware factors.

SUMMARY

The inventive concepts provide system-on-chip devices (SoCs) capable of predicting a performance of a processor when executing a function based on a history corresponding to the function and performing optimal control on the processor and/or operating methods of the SoC.

The inventive concepts are not limited to what is mentioned above and will be clearly understood by those skilled in the art from the descriptions below.

According to an aspect of the inventive concepts, an SoC may include a memory including a history storage, a processor configured to execute an application, a performance optimization module configured to generate and transmit optimized control information for the processor executing a function included in the application, based on a history corresponding to the function, when the processor executes the function and the history corresponding to the function is in the history storage, and a performance management module configured to generate a control signal for controlling performance of the processor, based on the optimized control information received from the performance optimization module, wherein the history includes control information for the processor and utilization information accumulated according to the control information, the control information having been accumulated during at least one time of previous execution of the function.

According to another aspect of the inventive concepts, an operating method of an SoC may include executing an application, generating optimized control information for a processor executing a function included in the application, based on a history corresponding to the function, when the processor executes the function and the history corresponding to the function is in a history storage, and generating a control signal for controlling performance of the processor, based on the optimized control information, wherein the history includes control information for the processor and utilization information accumulated according to the control information, the control information having been accumulated during at least one time of previous execution of the function.

According to a further aspect of the inventive concepts, an SoC including a memory may include a history storage, a processor configured to execute an application, and a performance controller configured to generate optimized control information for the processor executing a function included in the application, by processing a history corresponding to the function based on a run state of the processor, and generate a control signal for controlling performance of the processor, based on the optimized control information, when the processor executes the function, wherein the history includes control information for the processor and utilization information accumulated according to the control information, the control information having been accumulated during at least one time of previous execution of the function.

BRIEF DESCRIPTION OF THE DRAWINGS

Example embodiments will be more clearly understood from the following detailed description taken in conjunction with the accompanying drawings in which.

DETAILED DESCRIPTION

Specific structural and functional descriptions of some example embodiments of the inventive concepts are merely illustrated for the purpose of explaining example embodiments. Example embodiments of the inventive concepts may be implemented in various forms and are not limited to the example embodiments described below.

Hereinafter, some example embodiments are described in detail with reference to the accompanying drawings.

Figure 1:
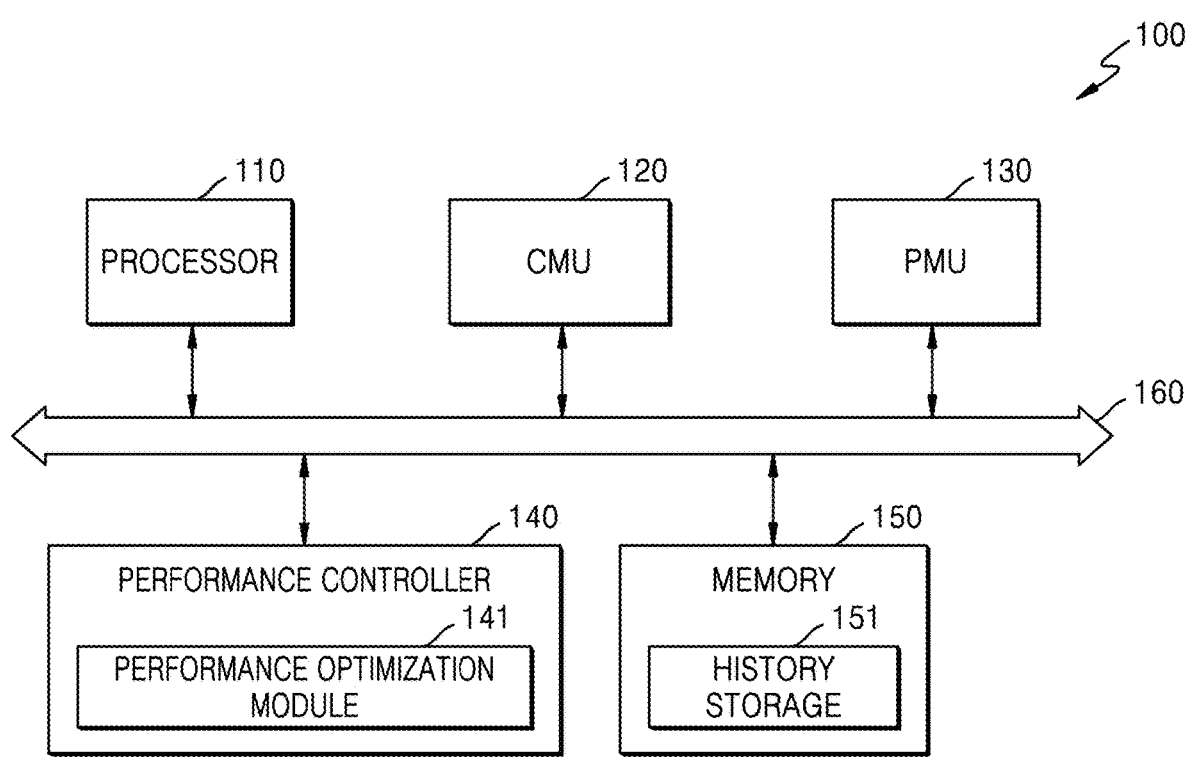
FIG. 1 is a schematic block diagram of a system-on-chip (SoC) according to an example embodiment.

FIG. 1 is a schematic block diagram of a system-on-chip (SoC) 100 according to an example embodiment.

Referring to FIG. 1, the SoC 100 may include a processor 110, a clock management unit (CMU) 120, a power management unit (PMU) 130, a performance controller 140, and a memory 150. The processor 110 and the performance controller 140 may be processing circuitry. Or restated, the SOC may include processing circuitry including the processor 110 and the performance controller 140.

The SoC 100 may be implemented as a personal computer (PC) or a mobile device. For example, the mobile device may include a laptop computer, a mobile phone, a smartphone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile Internet device (MID), a wearable computer, an Internet-of-things (IOT) device, an Internet-of-everything (IoE) device, a drone, or an e-book but is not limited thereto.

The processor 110, the CMU 120, the PMU 130, the performance controller 140, and the memory 150 may exchange data through a bus 160. The bus 160 may include advanced microcontroller bus architecture (AMBA), an advanced high-performance bus (AHB), an advanced peripheral bus (APB), an advanced extensible interface (AXI), an advanced system bus (ASB), AXI coherency extensions (ACE), or a combination thereof but is not limited thereto.

The processor 110 may include a control circuit, an integrated circuit (IC), a motherboard, a microprocessor, an application processor (AP), a mobile AP, a chip set, or a set of semiconductor chips but is not limited thereto.

In an example embodiment, when executing an application supported by an operating system (OS), the processor 110 may load, to an internal memory (e.g., a cache memory) thereof, the application, functions necessary (or alternatively, desired) to execute the application, and histories related to the functions.

In an example embodiment, when the processor 110 executes an application and/or a function included in the application, the processor 110 may control performance based on a control signal received from the performance controller 140. At this time, the control signal may be generated based on a history (e.g., a history entry) corresponding to the function.

The CMU 120 may control the frequency of each of clock signals by using a clock control signal. The frequencies of clock signals may be the same as or different from each other.

The PMU 130 may generate a control signal by using a power control signal and output the control signal to a power management IC (PMIC), thereby controlling the level of an operating voltage provided to components of the SoC 100.

In an example embodiment, dynamic voltage scaling (DVS), dynamic frequency scaling (DFS), or dynamic voltage and frequency scaling (DVFS) of the SoC 100 may be performed or controlled under control by the CMU 120 and the PMU 130.

In an example embodiment, when an application and/or a function included in the application is executed, the processor 110, the CMU 120, and the PMU 130 may control performance (e.g., an operating frequency, an operating voltage, or throttling) based on a control signal received from the performance controller 140.

The performance controller 140 may include a performance optimization module 141. Although it is illustrated in FIG. 1 that only the performance optimization module 141 is included in the performance controller 140, example embodiments are not limited thereto. Other modules included in the performance controller 140 are described in detail with reference to FIG. 2 below.

In an example embodiment, the performance controller 140 may identify functions for executing an application by using the performance optimization module 141, predict the performance of the processor 110 at the time of execution of each function by using each function's history stored in a history storage 151 of the memory 150, and generate optimized control information.

In an example embodiment, the performance controller 140 may generate a clock control signal and a power control signal by using software components (or hardware components) based on a history corresponding to a function and output the clock control signal to the CMU 120 and the power control signal to the PMU 130. The power control signal may be referred to as a voltage control signal.

The memory 150 may include random access memory (RAM), dynamic RAM (DRAM), or static RAM (SRAM) but is not limited thereto. In an example embodiment, the memory 150 may include a non-volatile memory device.

The non-volatile memory device may include a flash-based storage but is not limited thereto. For example, the flash-based storage may include a solid-state drive or solid-state disk (SSD), an embedded SSD (eSSD), a universal flash storage (UFS), a multimedia card (MMC), an embedded MMC (eMMC), or managed NAND but is not limited thereto.

In an example embodiment, the memory 150 may include the history storage 151. A function history of the history storage 151 may be generated with respect to a function for executing an application, by accumulating control information for the processor 110 and utilization information of the processor 110, wherein the control information is set after the function has been executed by the processor 110 at least once, and the utilization information is measured according to the control information.

According to an example embodiment for predictive control the performance of the processor 110, in the case where there is a history (e.g., a history entry) of a called function in the history storage 151, the performance controller 140 of the SoC 100 may predict the performance of the processor 110 and generate optimized control information when the called function is executed using the history of the called function, thereby efficiently controlling the performance of the processor 110.

Figure 2:
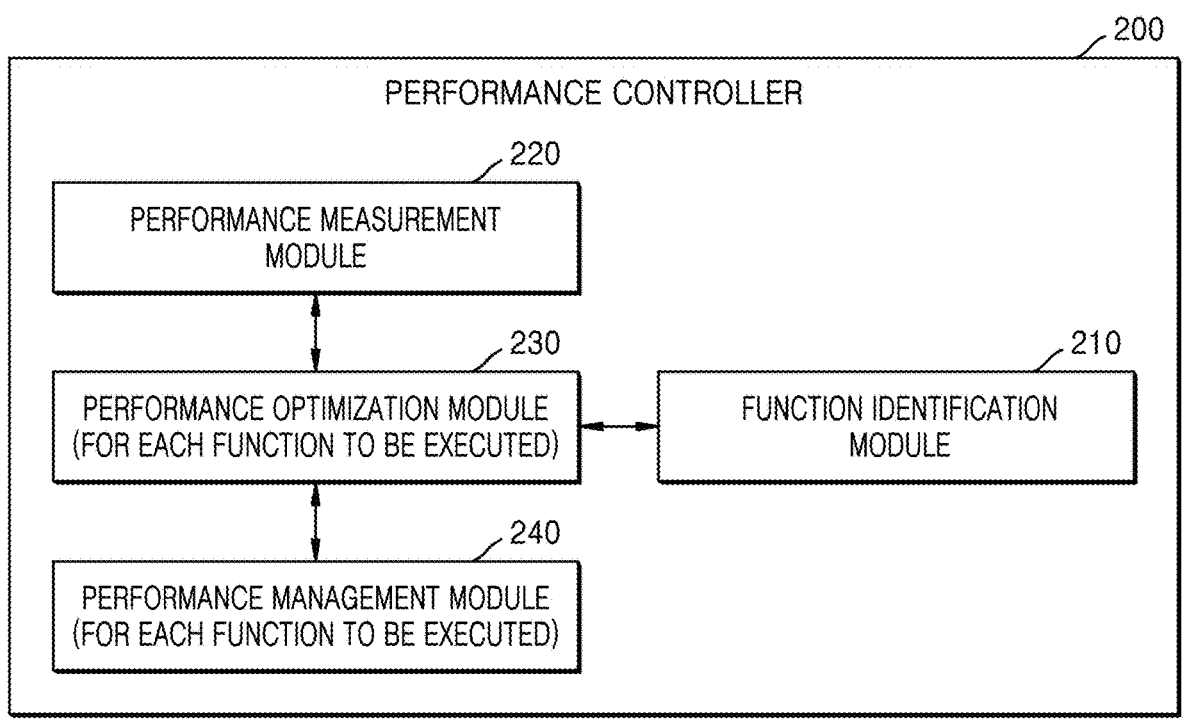
FIG. 2 is a block diagram of a performance controller according to an example embodiment.

FIG. 2 is a block diagram of a performance controller according to an example embodiment.

For example, a performance controller 200 of FIG. 2 corresponds to the performance controller 140 in FIG. 1.

The performance controller 200 may be driven by an OS. Here, that the performance controller 200 controls the performance of a processor may be interpreted as that an OS controls the performance of the processor. The performance controller 200 may generate optimized control information for the performance of a processor by using a history in a history entry for each function when the function is executed.

Here, the history may include control information, which has been accumulated when the function was previously executed at least once, for the processor and utilization information, which has been accumulated according to the control information, and may be stored in a history storage as the history entry.

To control performance with respect to each function necessary (or alternatively, desired) to execute an application supported by an OS, the performance controller 200 may include a function identification module 210, a performance measurement module 220, a performance optimization module 230, and a performance management module 240, which may be electrically connected to one another for data or signal exchange. The performance controller 200 may perform various functions including functions not discussed herein and may include processing circuitry to implement the various functions. The performance controller 140 may operate based on instructions stored in the memory 150 or may operate based on preprogrammed functions. For example, some or all of the modules of the performance controller 200 may be hardware circuitry such as a portion of a field programmable gate array.

The function identification module 210 may detect a call for a function, based on execution code information received from a processor. Here, the execution code information may include information indicating whether to call (start) and/or return (end) a function and start address information of the function.

In an example embodiment, the function identification module 210 may identify whether a history corresponding to a called function is in a history storage, based on an address (e.g., a start address) of the called function and a target address of a function included in a history entry (e.g., based on a result of comparing an address (e.g., a start address) of the called function with a target address of a function included in a history entry).

The performance measurement module 220 may measure the performance of a processor during execution of a function starting from when the function is called, generate actual utilization information, and transmit the actual utilization information to the performance optimization module 230.

Here, the actual utilization information may include at least one selected from the group consisting of internal state monitoring information of the processor, which is measured in a desired (or alternatively, predefined) sampling period, activity state information of the processor, activity cycle information, and information about whether a stall cycle is included, when the function is executed.

The performance optimization module 230 may generate optimized control information of a processor when a function is executed.

In an example embodiment, in the case where a history corresponding to a called function is in a history storage, the performance optimization module 230 may predict the performance of a processor when the called function is executed and generate optimized control information, by using the history corresponding to the called function.

In an example embodiment, the performance optimization module 230 may transmit the optimized control information to the performance management module 240. At this time, the performance optimization module 230 may be connected to the performance management module 240 through a path for transmission of the optimized control information.

In an example embodiment, the performance optimization module 230 may generate the optimized control information by processing the history corresponding to the function, according to the run state of the processor at the time when the function is called.

Here, the optimized control information may include at least one selected from the group consisting of code sequence information, utilization information, information on predicted power consumption of the processor, information on an operating voltage and an operating frequency that are predicted to be provided to the processor, predicted temperature information of the processor, predicted throttling information of the processor, and estimated measurement period information. An operation of generating the optimized control information, according to an example embodiment, is described in detail with reference to FIG. 3 below.

In an example embodiment, when the execution of the function ends, the performance optimization module 230 may receive the actual utilization information, which is measured during the execution of the function, from the performance measurement module 220.

In an example embodiment, in the case where there is a history entry corresponding to the function before the function is executed. the performance optimization module 230 may update the history entry based on the actual utilization information.

In an example embodiment, the performance optimization module 230 may update a history corresponding to the function by calculating representative control information and representative performance information during the execution of the function, based on the actual utilization information. Here, the representative control information may represent an average value of control information accumulated during the execution of the function with respect to the processor, and the representative performance information may represent an average value of performance information measured during the execution of the function with respect to the processor according to the control information. Here, the updated history may be linked to the start address of the function and stored in the history storage as a history entry. The history entry is described in detail with reference to FIGS. 5 and 6 below.

In an example embodiment, in the case where a history entry corresponding to the function is initially generated (i.e., in the case where there is no history entry corresponding to the function before the execution of the function), the performance optimization module 230 may delete the history entry corresponding to the function according to the operation period of the function.

In an example embodiment, to mitigate or prevent system overload, the performance optimization module 230 may delete a history entry corresponding to the function when the operation period of the function is less than a threshold value. This is described in detail with reference to FIG. 4 below.

The performance management module 240 may generate a control signal for the processor when the processor executes the function, based on the optimized control information received from the performance optimization module 230. Here, the control signal for the processor is defined as a control signal for controlling an internal module or an internal circuit of the processor, wherein the internal module or the internal circuit of the processor is needed to execute the function.

Although it is described with respect to FIG. 2 that a control signal is generated for a processor by generating optimized control information when the processor executes a function of an application, example embodiments are not limited thereto. Generation of optimized control information and control based on the optimized control information may also be performed with respect to other modules (e.g., pieces of intellectual property (IPs), a microprocessor unit (MPU), or a graphics processing unit (GPU)) that may control the performance of an SoC.

According to the aforementioned SoC and an operating method thereof, optimized control information may be generated using a history corresponding to a function when the function is executed, and the performance of a processor may be controlled based on the optimized control information, and therefore, micro-control may be possible in units of functions. Accordingly, the accuracy of system performance prediction may be increased, and system performance may be adaptively controlled according to an internal state of the SoC and a change in the setting of the SoC.

Figure 3:
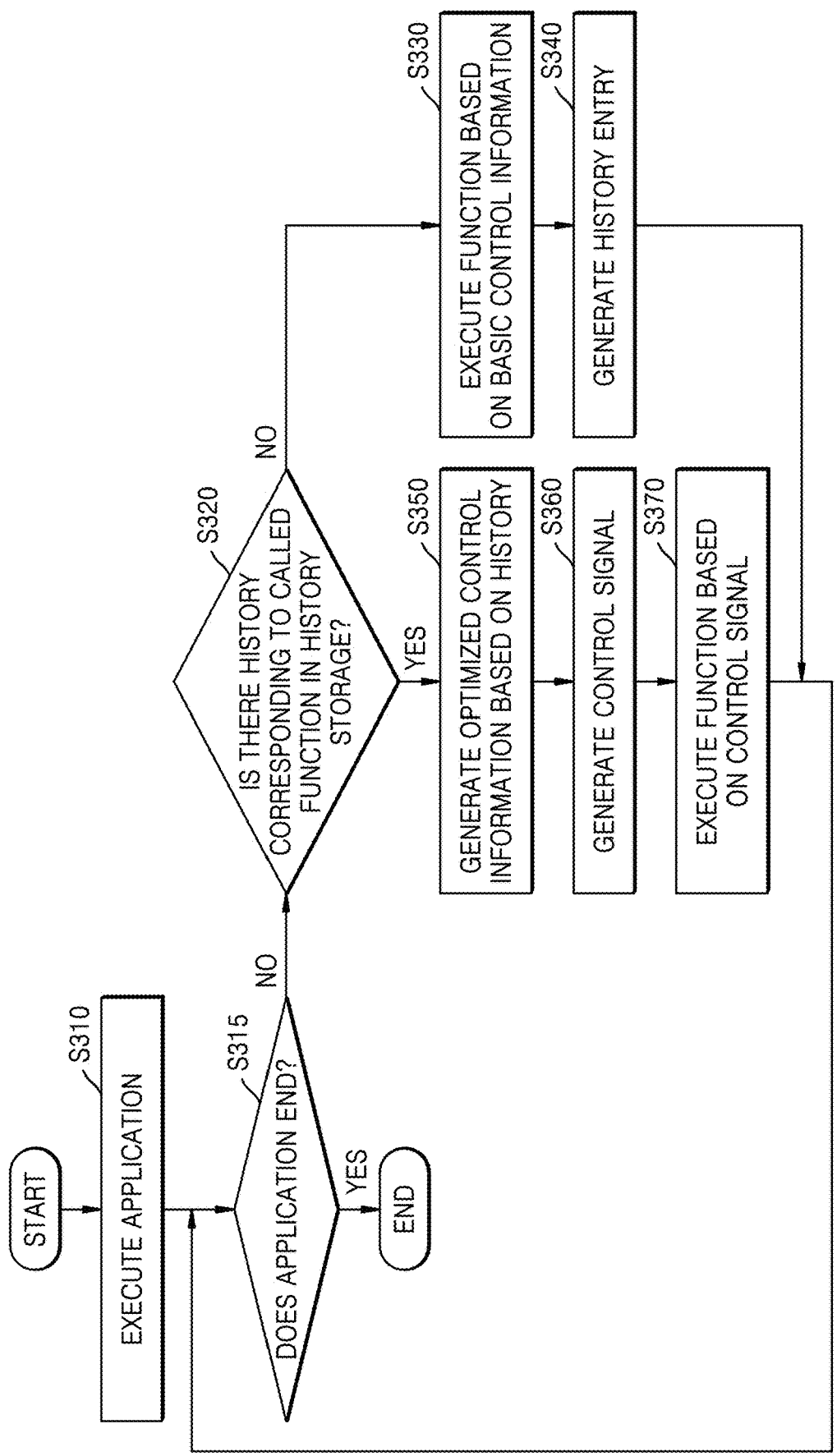
FIG. 3 is a flowchart of an operating method of an SoC, according to an example embodiment.

FIG. 3 is a flowchart of an operating method of an SoC, according to an example embodiment.

For example, FIG. 3 is a diagram for explaining an operation of generating, by a performance controller of the SoC, optimized control information by using a history related to a function required (or alternatively, desired) for an application when there is a history (or a history entry) corresponding to the function in a history storage.

Referring to FIG. 3, an operation of generating optimized control information and a control signal with respect to a function included in an application may include operations S310, S315, S320, S330, S340, S350, S360, and S370.

The performance controller of the SoC 100 may execute an application in operation S310. In an example embodiment, the executing of the application may include loading the application and related files (e.g., a function required (or alternatively, desired) to execute the application and a history related to the function) from an external memory to a cache memory of a central processing unit (CPU).

Here, the history may include control information, which has been accumulated when the function was previously executed at least once, for a processor and utilization information, which has been accumulated according to the control information. The history may be linked to an address (e.g., a start address) of the function and stored in a history storage as a history entry.

The performance controller may determine whether the execution of the application ends in operation S315. The performance controller may recognize functions for executing the application based on a code sequence characteristic and sequentially perform the recognized functions before the execution of the application ends.

In an example embodiment, in case of YES in operation S315, the performance controller may terminate the execution (or running) of the application and prepare for execution (or running) of another application.

In an example embodiment, the performance controller may determine whether the function to be currently executed is the last function among the recognized functions, based on the code sequence characteristic. When the function to be currently executed is the last function among the recognized functions, the performance controller may terminate the execution of the application as the execution of the lastly recognized function is completed.

In an example embodiment, in case of NO in operation S315, the performance controller may identify whether there is a history corresponding to the function that has been called in a history storage in operation S320. In other words, each time when there is a call for a function before the end of the execution of the application, the performance controller may identify whether there is a history corresponding to the called function in the history storage.

In an example embodiment, when the performance controller detects a call for a function, the performance controller may identify whether there is a history corresponding to the called function in the history storage by using a start address of the called function.

In an example embodiment, when there is a history corresponding to the called function in the history storage, the performance controller may perform operation S350. When there is no history corresponding to the called function in the history storage, the performance controller may perform operation S330.

The performance controller may execute the function based on basic control information in operation S330. In an example embodiment, when there is no history corresponding to the called function in the history storage, the performance controller may control the performance of the processor based on the basic control information when the processor executes the function.

The performance controller may generate a history corresponding to the function in operation S340. The performance controller may obtain actual utilization information of the processor by measuring the performance or run state of the processor during the execution of the function.

In an example embodiment, the performance controller may generate, as a history of a function or a history entry, an average value of control information set for the processor in each sampling period during the execution of the function and an average value of performance information of the processor measured in the sampling period according to the control information and may store the history entry in the history storage. This is described in detail with reference to FIG. 4 below.

In an example embodiment, the performance controller may predict the performance of the processor when the function is newly executed afterward (e.g., when the same function is executed again), based on the history, and control the performance of the processor when the function is newly executed actually.

The performance controller may generate optimized control information based on the history in operation S350.

In an example embodiment, when there is a history (or a history entry) corresponding to the called function in the history storage, the performance controller may identify the history linked to the called function in the history storage based on the start address of the called function. The performance controller may process the identified history based on the current performance/run state information of the processor, thereby generating the optimized control information for the processor executing the function.

Here, the optimized control information may be generated based on the current performance/run state information of the processor and the history corresponding to the function and may refer to control information for optimizing the performance of the processor when the processor executes the function.

For example, the optimized control information may include at least one selected from the group consisting of code sequence information, utilization information, information on predicted power consumption of the processor, information on an operating voltage and an operating frequency that are predicted to be provided to the processor, predicted temperature information of the processor, predicted throttling information of the processor, and estimated measurement period information, when the processor is driven according to the control information.

The performance controller may generate a control signal in operation S360. In an example embodiment, the performance controller may calculate the utilization, power consumption, performance, temperature, and the like of an execution module of the processor, based on the optimized control information, and generate a control signal for the processor when the processor executes the function, by using a result of the calculation. Here, the control signal for the processor may be defined as controlling the processor's internal module or circuit, which is necessary (or alternatively, desired) to execute the function.

The performance controller may execute the function required (or alternatively, desired) to execute the application, based on the control signal in operation S370.

Although it is described with respect to FIG. 3 that, when there is a history corresponding to a function that was previously executed at least once among functions required (or alternatively, desired) to execute an application, optimized control information and a control signal are generated for the processor by predicting the utilization or performance of the processor by using the history, example embodiments are not limited thereto. Generation of optimized control information and a control based on the optimized control information may also be performed with respect to other modules (e.g., IPs, an MPU, or a GPU) that may control the performance of an SoC.

According to the aforementioned SoC and an operating method thereof, in the case of a function that was previously executed at least once among functions included in execution code of an application and thus has a history (or a history entry) corresponding thereto, the performance of a processor may be predicted by using the history, which includes processor performance information measured according to control information when the function was previously executed. Therefore, the performance of the processor may be accurately predicted considering even software factors that change the performance of the processor. Consequently, the performance of the processor may be efficiently controlled.

Figure 4:
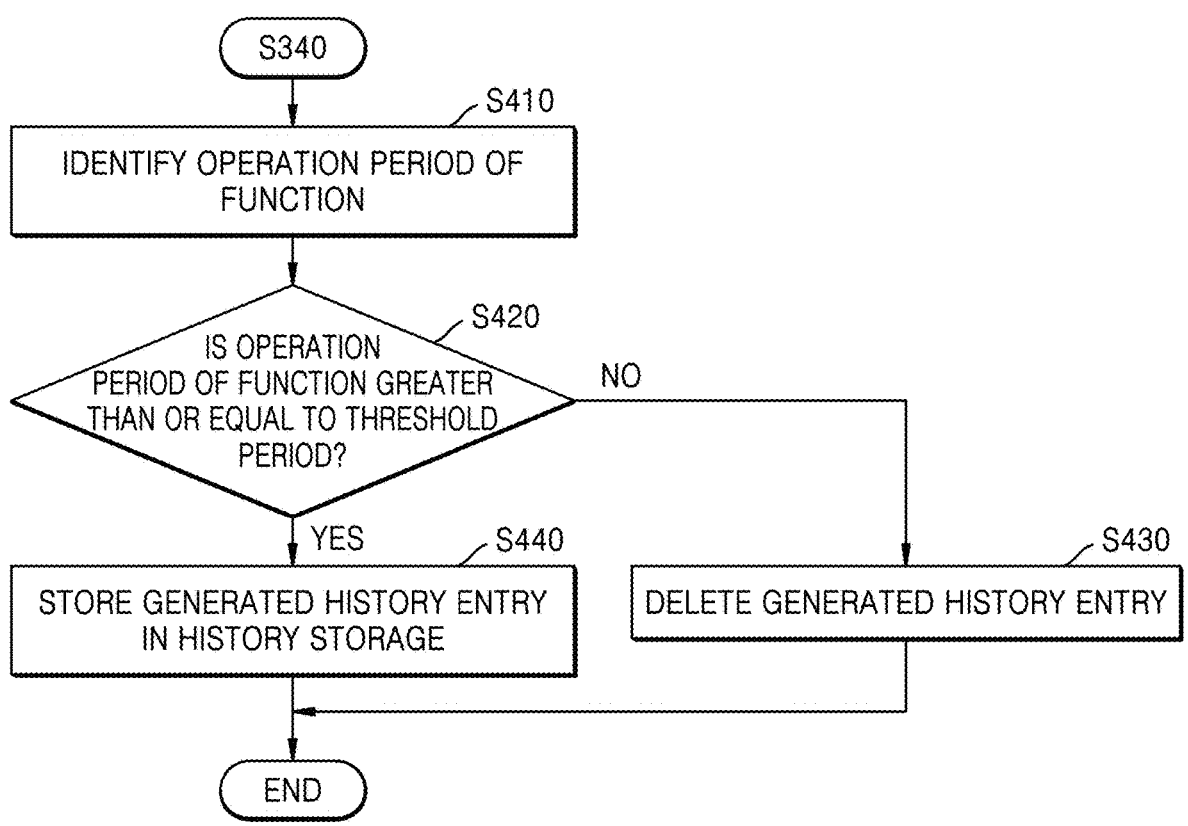
FIG. 4 is a flowchart of an operating method of an SoC, according to an example embodiment.

FIG. 4 is a flowchart of an operating method of an SoC, according to an example embodiment.

For example, FIG. 4 is a diagram for explaining an operation of generating, by a performance controller of the SoC, a history entry by using actual utilization information measured during execution of a function required (or alternatively, desired) for an application, when there is no history (or history entry) corresponding to the function in a history storage.

Referring to FIG. 4, an operation of generating a history entry corresponding to a function included in an application may include operations S410, S420, S430, and S440.

The performance controller of the SoC 100 may identify an operation period of the function in operation S410.

In an example embodiment, the performance controller may identify the operation period of the function, based on execution code information received from a processor. At this time, information on the operation period of the function may be later included in an operation period field of a history entry corresponding to the function.

The performance controller may identify whether the operation period of the function is greater than or equal to a threshold period in operation S420.

In an example embodiment, the performance controller may check the operation period field of the execution code information and obtain operation period information of the function. The performance controller may identify whether the operation period of the function is greater than or equal to the predefined threshold period, based on the operation period information.

In an example embodiment, when the operation period of the function is less than the threshold period, the performance controller may perform operation S430. When the operation period of the function is greater than or equal to the threshold period, the performance controller may perform operation S440.

The performance controller may delete a generated history entry in operation S430.

In an example embodiment, when the operation period of the function is less than the threshold period, the performance controller may delete a history entry corresponding to the function. The reason why the performance controller deletes a history entry corresponding to a function when the operation period of the function is less than the threshold period is to mitigate or prevent system performance degradation caused by system-wide overload occurring when a history entry is generated and managed with respect to every function included in an application.

The performance controller may store the generated history entry in the history storage in operation S440.

In an example embodiment, when the operation period of the function is greater than or equal to the threshold period, the performance controller may link the generated history entry to a start address of the function and store the generated history entry in the history storage.

Figure 5:
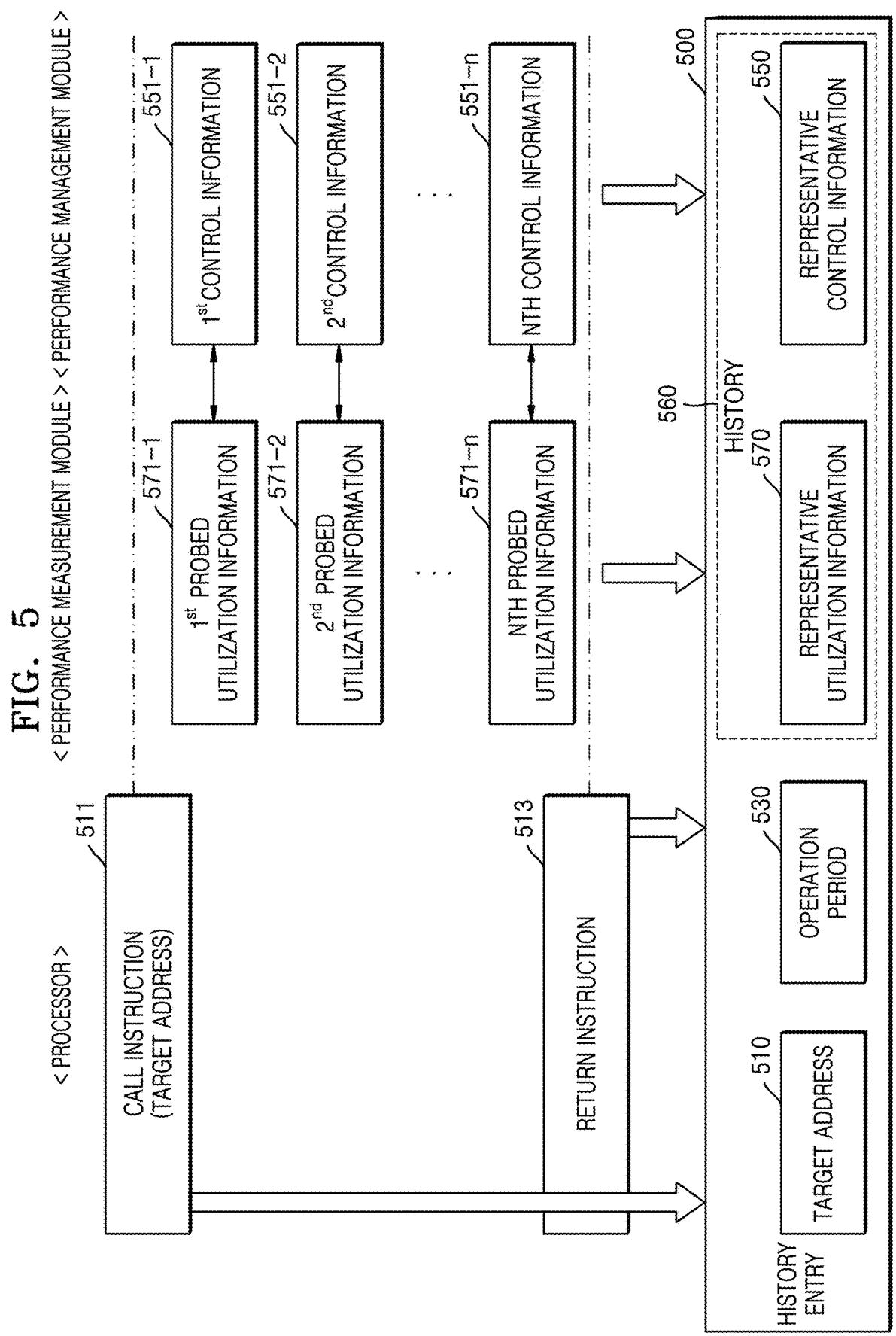
FIG. 5 is a diagram illustrating a history entry according to an example embodiment.

FIG. 5 is a diagram illustrating a history entry 500 in an SoC, according to an example embodiment.

Referring to FIG. 5, the history entry 500 may include a target address field 510, an operation period field 530, and a history field 560.

When there is no history entry corresponding to a called function, the history entry 500 shown in FIG. 5 may refer to a history entry that has been generated by an operation of generating a history entry. When there is a history entry corresponding to a called function, the history entry 500 shown in FIG. 5 may refer to a history entry resulting from a history entry update operation.

The target address field 510 may obtain a start address of a called function based on execution code information received from a processor and store the start address of the called function as a target address. The execution code information may include information on a call instruction 511 or a return instruction 513.

In an example embodiment, when the call instruction 511 with respect to a function is detected, a performance controller may compare the start address of the called function with an address stored in the target address field 510 of a history storage and identify whether a history corresponding to the called function is included in the history storage.

In an example embodiment, when the history corresponding to the called function is in the history storage, the performance controller may identify the history entry 500, which includes the target address field 510 including the start address of the called function, as a history entry of the called function.

In an example embodiment, when a history corresponding to the called function is not in the history storage, the performance controller may generate the history entry 500, which includes the target address field 510 including the start address of the called function.

The history field 560 may store a history linked to the target address of the target address field 510 of the history entry 500.

In an example embodiment, when the history corresponding to the called function is in the history storage, the performance controller may update the history field 560 of the history entry 500, based on predicted performance information and processor performance information (e.g., actual utilization information) measured during execution of the called function (e.g., based on a result of comparing predicted performance information with processor performance information (e.g., actual utilization information) measured during execution of the called function).

In an example embodiment, when a history corresponding to the called function is not in the history storage, the performance controller may generate the history field 560 of the history entry 500 based on the processor performance information (e.g., actual utilization information) measured during execution of the called function.

Here, the measured processor performance information may refer to processor performance information (e.g., first probed utilization information 571-1 to n-th probed utilization information 571-n) that is measured starting from the start time of a call for a function when the call instruction 511 with respect to the function is detected to the end time of the function when the return instruction 513 with respect to the function is detected.

In an example embodiment, the measured processor performance information may correspond to actual utilization information and may include at least one selected from the group consisting of information on an operating voltage and an operating frequency that are actually applied to the processor when the processor executes the function, internal state monitoring information of the processor, temperature information of the processor, actual throttling information, setting information regarding active clock gating, and utilization information of an execution module.

In an example embodiment, the performance controller may generate or update the history entry 500 by storing an average value of the first probed utilization information 571-1 to n-th probed utilization information 571-n in the history field 560.

In an example embodiment, the performance controller may generate or update the history entry 500 by storing a median value of the first probed utilization information 571-1 to n-th probed utilization information 571-n in the history field 560.

Although it has been described with respect to FIG. 5 that a history entry is updated by measuring the performance of a processor while the processor is executing a function, example embodiments are not limited thereto. History entry update using measured performance information may also be performed with respect to other modules (e.g., IPs, an MPU, or a GPU) that may control the performance of an SoC.

Figure 6:
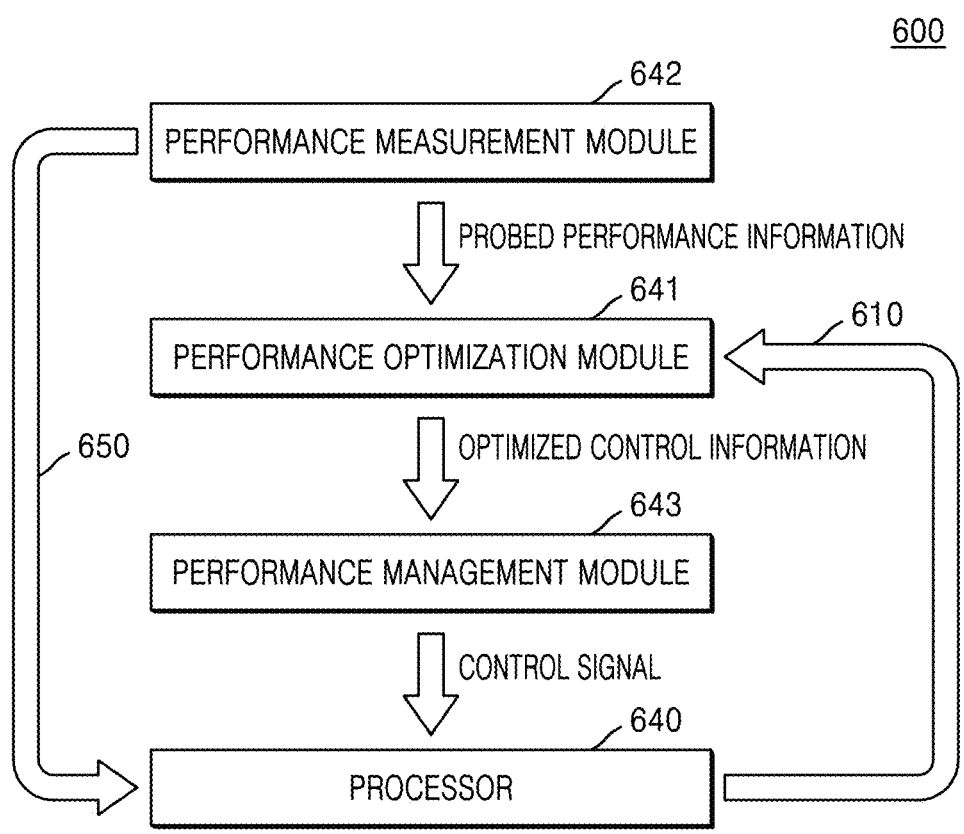
FIG. 6 is a block diagram for explaining a control system of an SoC, according to an example embodiment.

FIG. 6 is a block diagram for explaining a control system 600 of an SoC, according to an example embodiment.

For example, FIG. 6 illustrates the control system 600 included in an SoC. A processor 640, a performance optimization module 641, a performance measurement module 642, and a performance management module 643 in FIG. 6 may correspond to the performance controller 140, the performance optimization module 230, the performance measurement module 220, and the performance management module 240 in FIG. 2, respectively.

Referring to FIG. 6, the control system 600 may include the processor 640, the performance optimization module 641, the performance measurement module 642, and the performance management module 643.

To execute an application, when the processor 640 detects a call for a function, the processor 640 may provide execution code information 610 regarding the called function to the performance optimization module 641.

Based on the execution code information 610, the performance optimization module 641 may identify whether there is a history corresponding to the called function in a history storage.

When the history corresponding to the called function is in the history storage, the performance optimization module 641 may search the history storage for a start address of the called function and identify the history corresponding to the called function. Here, the history may include control information, which has been accumulated during at least one time of execution of the called function, for a processor and utilization information accumulated according to the control information.

The performance optimization module 641 may generate optimized control information by processing the history considering performance information (e.g., utilization information) of the processor 640 that has been measured (or probed) by the performance measurement module 642, and transmit the optimized control information to the performance management module 643, wherein the optimized control information is for the processor 640 when the processor 640 executes the function.

Here, the optimized control information may refer to control information for optimizing the performance of a processor when the processor executes a function, based on the performance/run state information (e.g., utilization information) of the processor and the identified history of the function.

Here, the optimized control information may include at least one selected from the group consisting of code sequence characteristic information, utilization information, information on predicted power consumption of a processor, information on an operating voltage and an operating frequency that are predicted to be provided to the processor, predicted temperature information of the processor, predicted throttling information of the processor, and estimated measurement period information.

The performance management module 643 may generate a control signal for the processor 640 based on the control information of the history and the optimized control information and control the processor 640 during the execution of the function.

During the execution of the function, the performance measurement module 642 may measure actual utilization information 650 with respect to the performance and run state of the processor 640. Here, the actual utilization information 650 may include at least one selected from the group consisting of information on an operating voltage and an operating frequency that are actually provided to the processor 640 and measured (or probed) in a desired (or alternatively, predefined) sampling period, internal state monitoring information of the processor 640, temperature information of the processor 640, actual activity cycle information, and information on whether a stall cycle is included, when the function is executed.

The performance optimization module 641 may update a history entry corresponding to the function, based on the actual utilization information 650, link the history entry to the start address of the function, and store the history entry in the history storage.

Although not shown, SoCs and operating methods thereof according to some example embodiments may also be applied to a multi-processor system such that optimized control information may be provided to each processor, and may be extended to some example embodiments that provide optimized performance control for a system through machine learning (e.g., training using a neural network) for optimized control information.

According to SoCs and operating methods thereof of some example embodiments, the performance of a system when each function is executed may be predicted using a history corresponding to the function, and therefore, unnecessary (or alternatively, undesirable) resource waste may be reduced or prevented and the overall performance of the system including a processor may be increased through efficient control.

Figure 7:
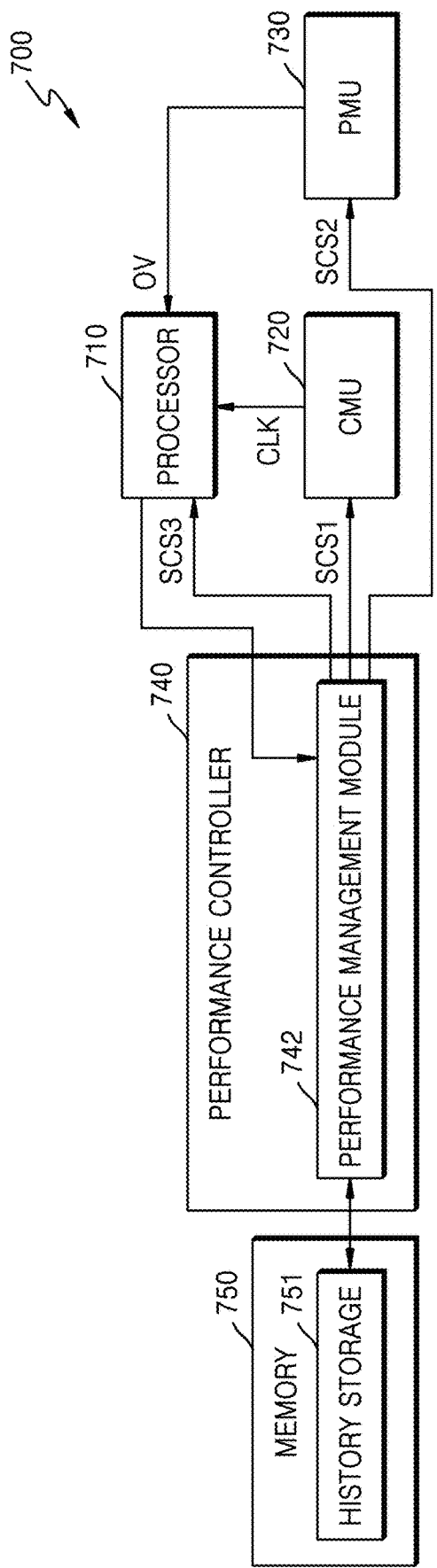
FIG. 7 is a block diagram of an SoC according to an example embodiment.

FIG. 7 is a block diagram of an SoC according to an example embodiment.

Referring to FIG. 7, an SoC 700 may include a processor 710, a CMU 720, a PMU 730, a performance controller 740, and a memory 750. The SoC 700 may include processing circuitry which includes the processor 710, the CMU 720, the PMU 730, and the performance controller 740.

The performance controller 740 may include a performance management module 742. In an example embodiment, the performance management module 742 may generate a k-th control signal corresponding to k-th optimized control information for controlling the performance of the processor 710 that executes a k-th function. A control signal may include a first sub control signal SCS1 provided to the CMU 720, a second sub control signal SCS2 provided to the PMU 730, and a third sub control signal SCS3 provided to the processor 710.

In an example embodiment, the CMU 720 may adjust an operating frequency based on the first sub control signal SCS1 and provide a clock signal CLK having the adjusted operating frequency to the processor 710.

In an example embodiment, the PMU 730 may adjust an operating voltage based on the second sub control signal SCS2 and provide an adjusted operating voltage OV to the processor 710.

In an example embodiment, the processor 710 may perform throttling control and/or active clock gating control on functional blocks thereof based on the third sub control signal SCS3.

In an example embodiment, the performance management module 742 may measure actual performance of the processor 710 according to the first to third sub controls signals SCS1 to SCS3 and generate k-th actual utilization information. The performance management module 742 may update a history storage 751 based on an average value of the k-th actual utilization information. For example, when the execution of the k-th function is completed, the performance management module 742 may update an existing k-th history in the history storage 751 with the k-th actual utilization information.

Figure 8:
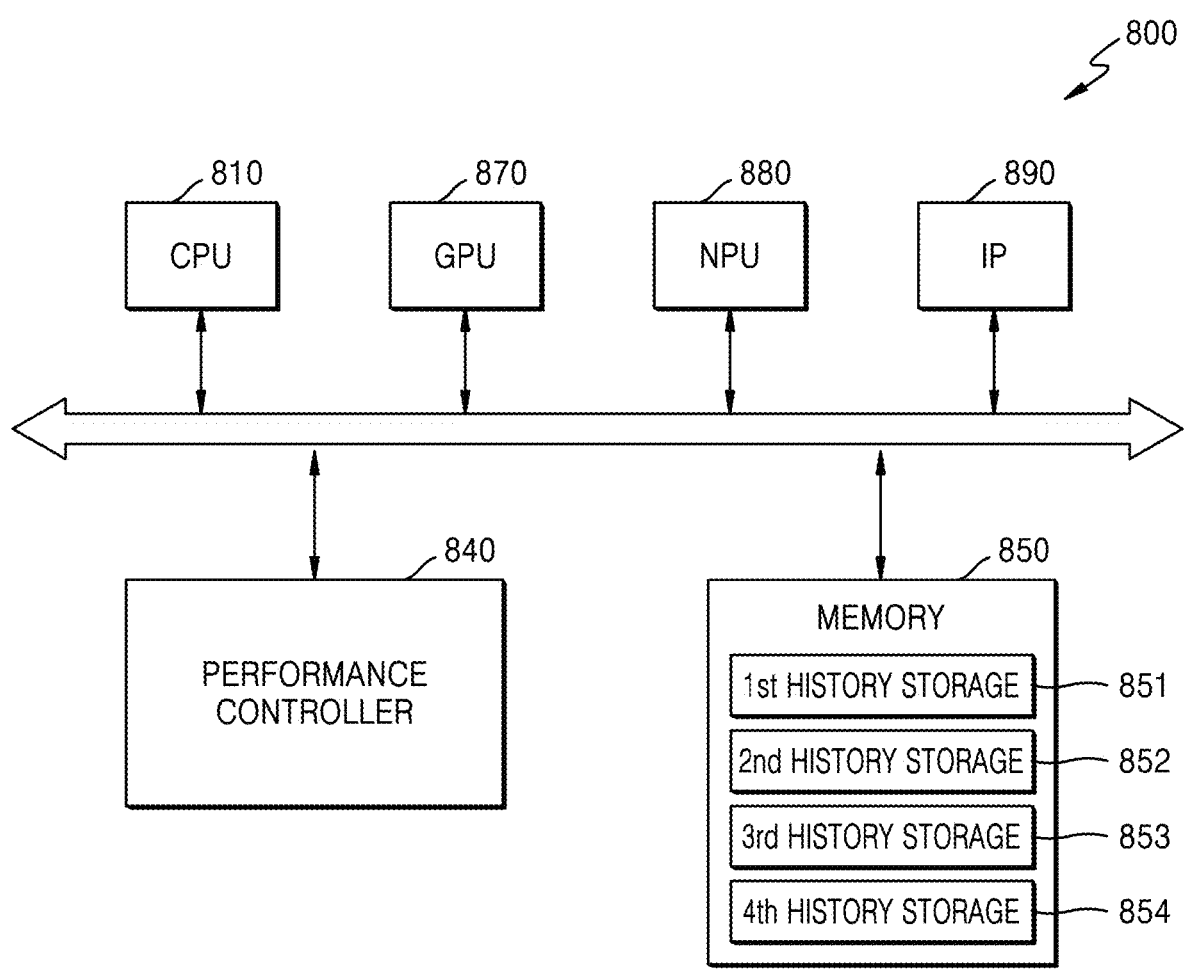
FIG. 8 is a block diagram of an SoC according to an example embodiment.

FIG. 8 is a block diagram of an SoC according to an example embodiment.

Referring to FIG. 8, an SoC 800 may include a CPU 810, a GPU 870, a neural processing unit (NPU) 880, optional IP 890, a performance controller 840, and a memory 850. Each of the CPU 810, the GPU 870, and the NPU 880 may be referred to as IP.

In an example embodiment, the memory 850 may include first to fourth history storages 851 to 854. The first history storage 851 may be used for performance control of the CPU 810 with respect to each function, the second history storage 852 may be used for performance control of the GPU 870 with respect to each function, the third history storage 853 may be used for performance control of the NPU 880 with respect to each function, and the fourth history storage 854 may be used for performance control of the optional IP 890 with respect to each function.

In an example embodiment, the CPU 810 may execute first code corresponding to at least one first application, and the first code may include a plurality of first functions. The first history storage 851 may store a plurality of first history information pieces respectively corresponding to the first functions.

In an example embodiment, the GPU 870 may execute second code corresponding to at least one second application, and the second code may include a plurality of second functions. The second history storage 852 may store a plurality of second history information pieces corresponding to the second functions, respectively.

In an example embodiment, the NPU 880 may execute third code corresponding to at least one third application, and the third code may include a plurality of third functions. The third history storage 853 may store a plurality of third history information pieces corresponding to the third functions, respectively.

In an example embodiment, the optional IP 890 may execute fourth code corresponding to at least one fourth application, and the fourth code may include a plurality of fourth functions. The fourth history storage 854 may store a plurality of fourth history information pieces corresponding to the fourth functions, respectively.

In an example embodiment, the performance controller 840 may perform performance control of the CPU 810 with respect to each function executed by the CPU 810 by using the first history storage 851, perform performance control of the GPU 870 with respect to each function executed by the GPU 870 by using the second history storage 852, perform performance control of the NPU 880 with respect to each function executed by the NPU 880 by using the third history storage 853, and perform performance control of the optional IP 890 with respect to each function executed by the optional IP 890 by using the fourth history storage 854.

The CPU 810, the GPU 870, the NPU 880, and the optional IP 890 may have different characteristics from one another. Here, the characteristic may be defined as a type, maximum performance, or the like of each function executed by an IP.

In an example embodiment, the performance controller 840 may generate the first to fourth history storages 851 to 854, based on the characteristics of the CPU 810, the GPU 870, the NPU 880, and the optional IP 890, respectively.

Figure 9:
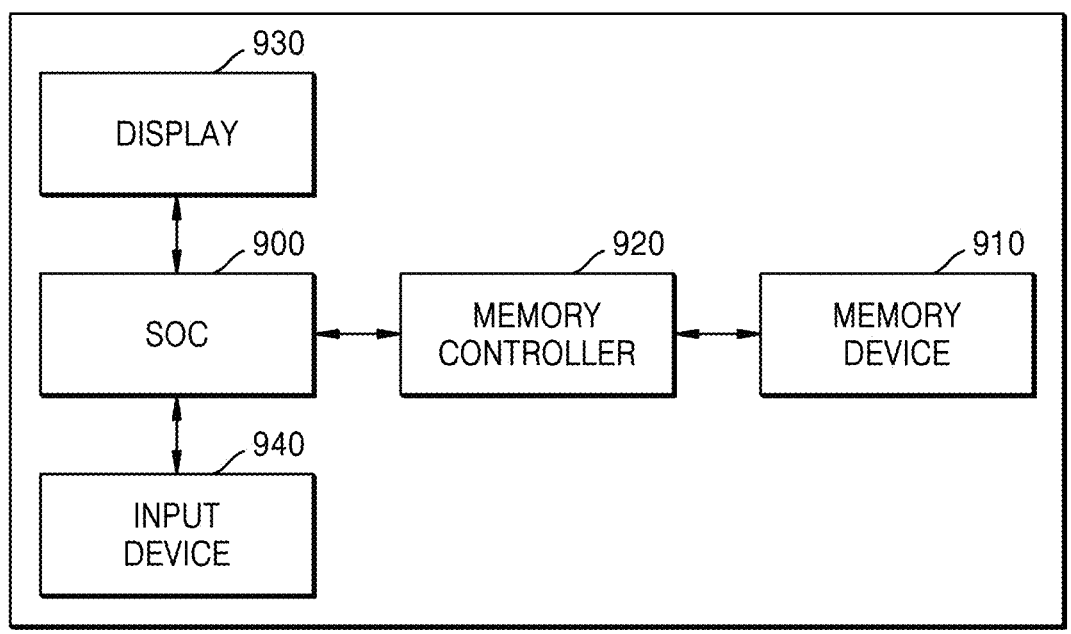
FIG. 9 is a diagram of a computer system including an SoC, according to an example embodiment.

FIG. 9 is a diagram of a computer system including an SoC, according to an example embodiment.

For example, FIG. 9 illustrates a computer system including the SoC 100 of FIG. 1. An SoC 900 in FIG. 9 may correspond to the SoC 100 of FIG. 1.

Referring to FIG. 9, the computer system including the SoC 900 according to an example embodiment may include the SoC 900, a memory device 910, a memory controller 920 controlling a data processing operation of the memory device 910, a display 930, and an input device 940.

In an example embodiment, the computer system may include a PC, a network server, a tablet PC, a netbook, an e-reader, a PDA, a PMP, an MP3 player, or an MP4 player.

According to data input through the input device 940, the SoC 900 may display data (a history entry), which is stored in the memory device 910, on the display 930.

In an example embodiment, the input device 940 may receive a control signal for controlling the operation of the SoC 900 or data to be processed by the SoC 900 and may include a pointing device, such as a touch pad or a computer mouse, a keypad, or a keyboard.

The SoC 900 may generally control operations of the computer system and control operations of the memory controller 920. In an example embodiment, the SoC 900 may store a history storage, which is necessary (or alternatively desired) to execute a function of an application, in the memory device 910 through the memory controller 920. The SoC 900 may receive a history (or a history entry) from the memory device 910 through the memory controller 920 when the SoC 900 executes the function.

In an example embodiment, the SoC 900 may store actual utilization information, which is measured during the execution of the function, in the memory device 910 through the memory controller 920.

In an example embodiment, when the execution of the function ends, the SoC 900 may link the history entry, which is updated based on the actual utilization information, to a start address of the function and store the history entry in the memory device 910 through the memory controller 920.

In an example embodiment, the memory controller 920 that may control the operations of the memory device 910 may be implemented as a part of the SoC 900 or a separate chip from the SoC 900.

Figure 10:
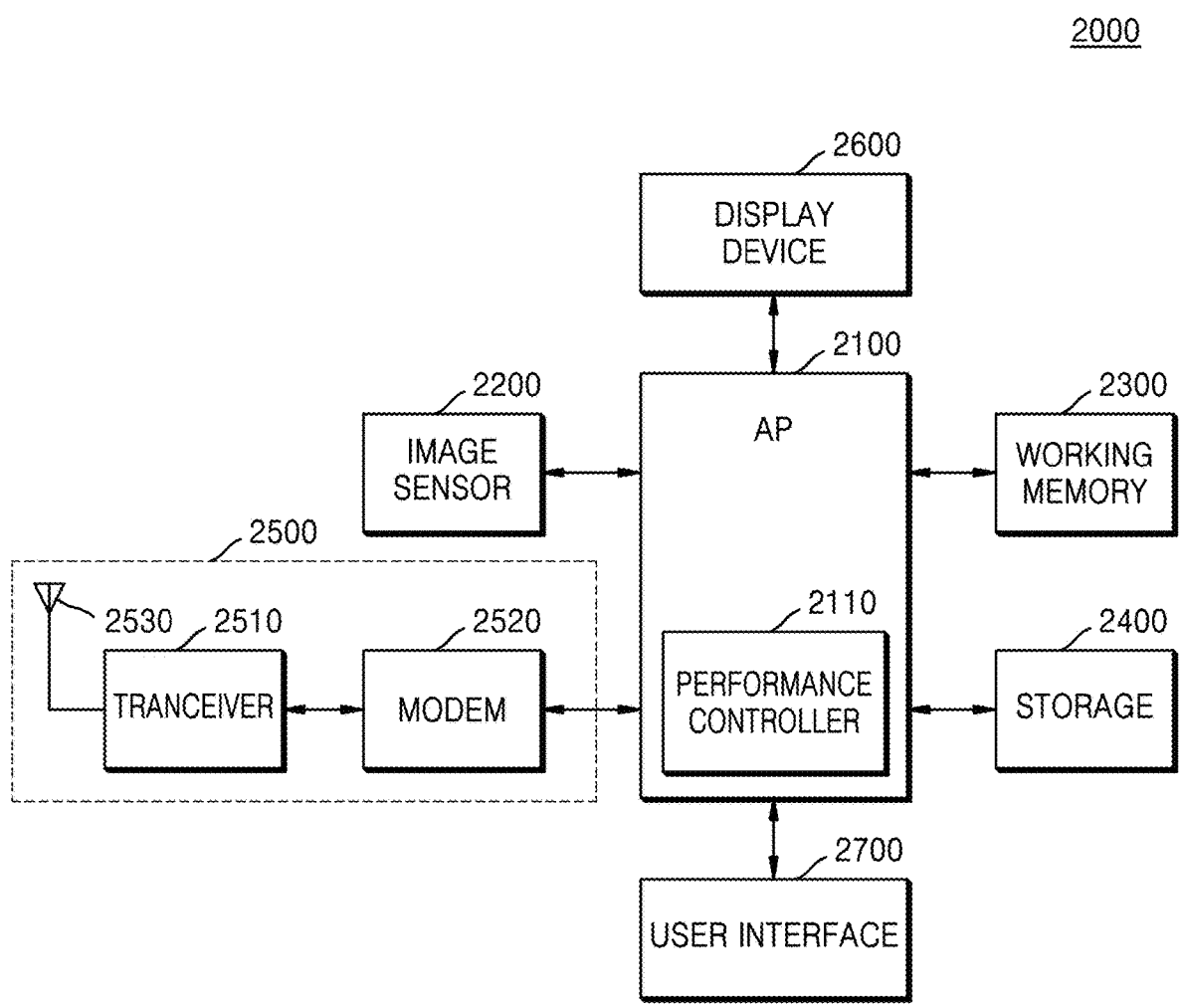
FIG. 10 is a block diagram of an electronic device including a performance controller, according to an example embodiment.

FIG. 10 is a block diagram of an electronic device 2000 including a performance controller, according to an example embodiment. The electronic device 2000 of FIG. 10 may correspond to a portable terminal.

Referring to FIG. 10, the electronic device 2000 may include an AP 2100, an image sensor 2200, a display device 2600, a working memory 2300, a storage 2400, a user interface 2700, and a wireless transceiver 2500.

The AP 2100 may correspond to a main processor of the electronic device 2000 and may be implemented as an SoC, which generally controls operations of the electronic device 2000 and runs an application program, an OS, or the like. The AP 2100 may provide image data from the image sensor 2200 to the display device 2600 or store the image data in the storage 2400. The SoC described above may be applied as the AP 2100.

The AP 2100 may include a performance controller 2110. The operations of the performance controller 140, which have been described with reference to FIGS. 1 to 9, may be applied to the performance controller 2110.

A plurality of functional blocks of the AP 2100 may access shared resources, e.g., the working memory 2300, through a system interconnect circuit.

The performance controller 2110 may generate optimized control information by processing a history, based on the run state of the AP 2100 when a function is executed, and generate a control signal for the AP 2100 by using the optimized control information. Here, the history may include control information, which has been accumulated when a function was previously executed at least once, for the AP 2100 and utilization information, which has been accumulated according to the control information.

The performance controller 2110 may obtain actual utilization information of the AP 2100 while the function is executed using the control signal. When the function is executed, the performance controller 2110 may update the history based on control information, which is set in a desired (or alternatively, predefined) sampling period, and actual utilization information of the AP 2100, which is measured according to the control information during the sampling period. Accordingly, when an application is executed, the performance of the AP 2100 may be predicted with respect to each function, and therefore, the performance of the AP 2100 may be efficiently controlled based on accurate performance prediction, without an unnecessary (or alternatively, undesirable) waste of system resources.

The working memory 2300 may include volatile memory, such as DRAM or SRAM, or non-volatile resistive-type memory, such as phase-change RAM (PRAM) or resistive RAM (ReRAM). An operating program or an application program, which is stored in the storage 2400, may be loaded to the working memory 2300 and executed. Data generated during the operation of the electronic device 2000 may be temporarily stored in the working memory 2300.

The storage 2400 may include non-volatile memory, such as NAND flash or resistive-type memory. For example, the storage 2400 may be provided as a memory card (e.g., an MMC, an eMMC, a secure digital (SD) card, or a micro SD card). The storage 2400 may store image data provided from the image sensor 2200. The storage 2400 may store an operating program, an application program, a history storage, or the like of the electronic device 2000.

The user interface 2700 may include various devices, such as a keyboard, a button key panel, a touch panel, a fingerprint sensor, and a microphone, which may receive a user input. The user interface 2700 may receive a user input and provide a signal corresponding to the user input to the AP 2100.

The wireless transceiver 2500 may include a transceiver 2510, a modem 2520, and an antenna 2530. The wireless transceiver 2500 may wirelessly communicate with an external device and may receive data from or transmit data to the external device.

Any functional blocks shown in the figures and described above may be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

While the inventive concepts have been particularly shown and described with reference to some example embodiments thereof, it will be understood that various changes in form and details may be made therein without departing from the spirit and scope of the following claims.

What is claimed is:

1. A system-on-chip (SoC) comprising:
a memory including a history storage;
a processor configured to execute an application;
a performance optimization module configured to generate and transmit optimized control information for the processor executing a function included in the application, based on a history corresponding to the function, when the processor executes the function and the history corresponding to the function is in the history storage; and
a performance management module configured to generate a control signal for controlling performance of the processor, based on the optimized control information received from the performance optimization module, wherein the history includes control information for the processor and utilization information accumulated according to the control information, the control information having been accumulated during at least one time of previous execution of the function, and wherein the performance optimization module is further configured to generate a history entry based on the control information set in a desired sampling period and actual utilization information of the processor, the actual utilization information being measured according to the control information in the desired sampling period, identify operation period information of the function in the history entry, delete the history entry when an operation period of the function is less than a threshold value, and store the history entry in the history storage when the operation period of the function is greater than or equal to the threshold value.

2. The SoC of claim 1, wherein the optimized control information includes at least one selected from the group consisting of code sequence characteristic information, the utilization information, information on predicted power consumption of the processor, information on an operating voltage and an operating frequency that are predicted to be provided to the processor, predicted temperature information of the processor, predicted throttling information of the processor, and estimated measurement period information.

3. The SoC of claim 1, further comprising:
a performance measurement module configured to,
measure the performance of the processor when the function is executed,
obtain the actual utilization information of the processor, and
transmit the actual utilization information to the performance optimization module.

4. The SoC of claim 3, wherein the actual utilization information includes at least one selected from the group consisting of internal state monitoring information of the processor, activity state information of the processor, activity cycle information, and information about whether a stall cycle is included, when the function is executed, the internal state monitoring information being measured in the desired sampling period.

5. The SoC of claim 4, wherein the performance optimization module is further configured to update the history based on the control information set in the desired sampling period and the actual utilization information of the processor, the actual utilization information being measured according to the control information in the desired sampling period.

6. The SoC of claim 5, wherein the performance optimization module is further configured to,
link an updated history to a start address of the function, and
store the updated history in the history storage.

7. The SoC of claim 1, wherein, when the history corresponding to the function is not in the history storage at a time of execution of the function,
the performance management module is further configured to generate the control signal for controlling the performance of the processor, based on default control information.

8. An operating method of a system-on-chip (SoC), the operating method comprising:
executing an application;
generating optimized control information for a processor executing a function included in the application, based on a history corresponding to the function, when the processor executes the function and the history corresponding to the function is in a history storage; and
generating a control signal for controlling performance of the processor, based on the optimized control information, wherein the history includes control information for the processor and utilization information accumulated according to the control information, the control information having been accumulated during at least one time of previous execution of the function, and wherein the operating method further comprises
generating a history entry based on the control information set in a desired sampling period and actual utilization information of the processor, the actual utilization information being measured according to the control information in the desired sampling period,
identifying operation period information of the function in the history entry,
deleting the history entry when an operation period of the function is less than a threshold value, and
storing the history entry in the history storage when the operation period of the function is greater than or equal to the threshold value.

9. The operating method of claim 8, wherein the optimized control information includes at least one selected from the group consisting of code sequence information, the utilization information, information on predicted power consumption of the processor, information on an operating voltage and an operating frequency that are predicted to be provided to the processor, predicted temperature information of the processor, predicted throttling information of the processor, and estimated measurement period information.

10. The operating method of claim 8, further comprising:
measuring the performance of the processor when the function is executed; and
obtaining the actual utilization information of the processor.

11. The operating method of claim 10, wherein the actual utilization information includes at least one selected from the group consisting of internal state monitoring information of the processor, activity state information of the processor, activity cycle information, and information about whether a stall cycle is included, when the function is executed, the internal state monitoring information being measured in the desired sampling period.

12. The operating method of claim 11, further comprising:
updating the history based on the control information set in the desired sampling period and the actual utilization information of the processor, the actual utilization information being measured according to the control information in the desired sampling period.

13. The operating method of claim 12, further comprising:
linking an updated history to a start address of the function; and
storing the updated history in the history storage.

14. The operating method of claim 8, further comprising:
when the history corresponding to the function is not in the history storage at a time of execution of the function, generating the control signal for controlling the performance of the processor, based on default control information.

15. A system-on-chip (SoC) comprising:
a memory including a history storage;
a processor configured to execute an application; and
a performance controller configured to,
  generate optimized control information for the processor executing a function included in the application, by processing a history corresponding to the function based on a run state of the processor, and
  generate a control signal for controlling performance of the processor, based on the optimized control information, when the processor executes the function,
wherein the history includes control information for the processor and utilization information accumulated according to the control information, the control information having been accumulated during at least one time of previous execution of the function, and
wherein the performance controller is further configured to
  generate a history entry based on the control information set in a desired sampling period and actual utilization information of the processor, the actual utilization information being measured according to the control information in the desired sampling period,
  identify operation period information of the function in the history entry,
  delete the history entry when an operation period of the function is less than a threshold value, and
  store the history entry in the history storage when the operation period of the function is greater than or equal to the threshold value.

16. The SoC of claim 15, wherein the optimized control information includes at least one selected from the group consisting of code sequence characteristic information, the utilization information, information on predicted power consumption of the processor, information on an operating voltage and an operating frequency that are predicted to be provided to the processor, predicted temperature information of the processor, predicted throttling information of the processor, and estimated measurement period information.

17. The SoC of claim 15, wherein the performance controller is further configured to,
  measure the performance of the processor in the desired sampling period when the function is executed,
  obtain the control information and the actual utilization information of the processor in the desired sampling period, and
  update the history by using the obtained control information and the obtained actual utilization information.

18. The SoC of claim 17, wherein the actual utilization information includes at least one selected from the group consisting of internal state monitoring information of the processor, activity state information of the processor, activity cycle information, and information about whether a stall cycle is included, when the function is executed, the internal state monitoring information being measured in the desired sampling period.

* * * * *